No. 748,859. PATENTED JAN. 5, 1904.
J. H. GRISWOLD.
DISH WASHING MACHINE.
APPLICATION FILED APR. 20, 1903.
NO MODEL.

WITNESSES:
F. C. Fliedner,

INVENTOR.
John H. Griswold
BY Geo. H. Strong,
ATTORNEY.

No. 748,859. Patented January 5, 1904.

UNITED STATES PATENT OFFICE.

JOHN H. GRISWOLD, OF OAKLAND, CALIFORNIA.

DISH-WASHING MACHINE.

SPECIFICATION forming part of Letters Patent No. 748,859, dated January 5, 1904.

Application filed April 20, 1903. Serial No. 153,391. (No model.)

*To all whom it may concern:*

Be it known that I, JOHN H. GRISWOLD, a citizen of the United States, residing in Oakland, county of Alameda, State of California, have invented an Improvement in Dish-Washing Machines; and I hereby declare the following to be a full, clear, and exact description of the same.

My invention relates to an apparatus which is especially designed for washing dishes and the like; and it may also be converted into a stationary sink, or for the purpose of retaining water, or for any other desired use.

It consists of a containing-tank having closed sides, bottom, and ends and so suspended in a fixed structure that it may be oscillated or tilted in the direction of its length. Trays or baskets of wire-mesh or other equivalent open work are placed in the ends of this tank and a sufficient amount of water for washing purposes. Between the inner ends of the baskets are located hinged swinging gates, the fulcrums of which extend across the tub, and the gates incline downwardly and inwardly, so that their lower edges rest upon the bottom of the tub. The tub when free to be tilted from one side to the other will cause the water to move alternately from end to end and through the trays containing the articles to be washed.

Figure 1:
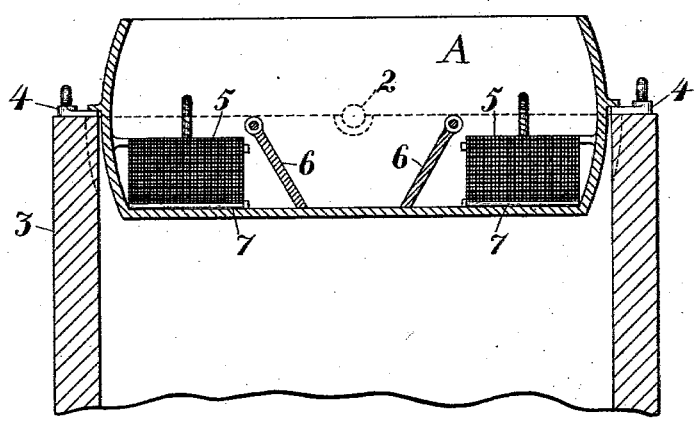
Figure 2:
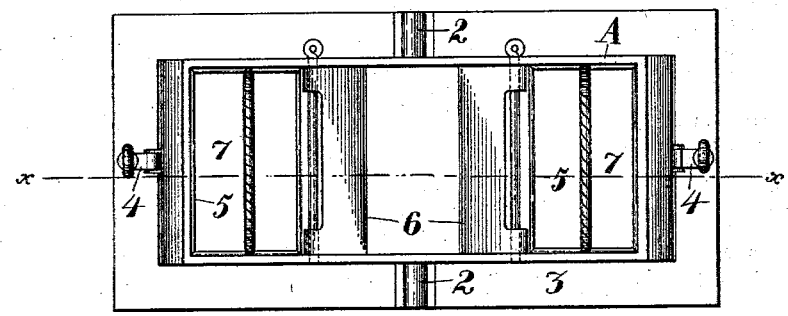
Figure 3:
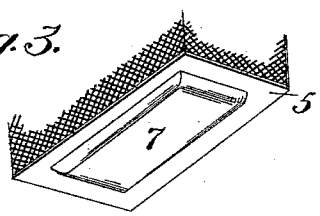

In the accompanying drawings, Figure 1 is a longitudinal vertical section of a dish-washing machine on the line $x\,x$ of Fig. 2. Fig. 2 is a plan view of Fig. 1. Fig. 3 is a detail in perspective, showing one of the false bottoms 7.

A is a receptacle having a tight bottom and sides and having trunnions 2, about which it may be oscillated. This receptacle is preferably inclosed, as at 3, and by means of suitable latches or stops, as at 4, it may be normally retained in a horizontal stationary position to serve its purpose. When it is desired to use it for washing purposes, wire or equivalent open-mesh baskets 5 are fixed in each end of the receptacle, and by releasing the latches the receptacle can be oscillated upon its trunnions, so as to dash the cleansing liquid from end to end and through the baskets and their contents. Adjacent to or upon the inner ends of the baskets are hinged gates 6, the hinges extending transversely across the receptacle, so that the gates may rise and fall about these hinges and so that the lower edges of the gates rest upon the bottom of the tub and preferably convergent toward the center. These gates are of such length as to extend substantially from side to side, and thus form dams across the receptacle.

The receptacle may be oscillated in any well-known manner, or it may be operated by alternately depressing its ends, and when the articles to be washed have been placed in the trays and the trays within the receptacle a sufficient amount of water is added for the desired purpose. By now oscillating the receptacle upon its central support the water will alternately dash through the baskets toward the center of the tub and will lift the gate at that end of the basket, so as to substantially pass beneath the flap and striking the opposite gate it will rise over the top and be dashed into the basket which is at that instant being depressed. When the apparatus is tilted in the opposite direction, the returning water will raise the contiguous gate 6 and strike the hinge-gate and passing under it will be again raised by the opposite gate and will be dashed against the articles in the opposite tray.

The gates may be hinged in any well-known and appropriate manner, and they are preferably removably attached, so as to leave the receptacle in its normal unobstructed condition, and when fixed it becomes a receptacle for ordinary uses.

In order to prevent drip when dishes are removed from the table, I prefer to employ shallow false bottoms, as at 7, which will not obstruct the passage of water through the baskets, but will retain drippings when lifted.

The ends of the receptacle may be of any suitable form, but if made in segments radial to the center of oscillation the receptacle will fit more closely within its surrounding structure.

Having thus described my invention, what I claim, and desire to secure by Letters Patent, is—

1. A washing apparatus comprising a centrally-supported receptacle adapted to tilt in the direction of its length, said receptacle having a closed bottom and sides and ends, hinged gates extending transversely across the receptacle with their lower edges normally resting upon the bottom thereof, said gates separated to form an intermediate space, baskets between the gates and the inner walls of the receptacle and adapted for the reception of articles to be washed, and means whereby the receptacle is oscillated in the direction of its length.

2. The combination in a washing device of a receptacle having closed bottom, sides and ends, a support upon which its center rests and about which it is tiltable in the direction of its length, gates hinged transversely across the interior of the receptacle and inclined toward the center thereof and resting upon the bottom, removable foraminous baskets to contain articles to be washed, located exterior to the gates, and means whereby the receptacle may be oscillated upon its support.

3. The combination in a washing-machine of a receptacle having substantially straight closed bottom and sides and semicircular ends, removable foraminous baskets at each end to contain articles to be washed, inclined gates having their upper edges pivoted transversely of the receptacle and contiguous to the inner ends of the baskets, and their lower edges movably resting upon the bottom of the receptacle, central pivots upon which the receptacle is tiltable in the direction of its length, and latches adjustable between the support and the receptacle.

In witness whereof I have hereunto set my hand.

JOHN H. GRISWOLD.

Witnesses:
S. H. NOURSE,
JESSIE C. BRODIE.